United States Patent
Duffy et al.

(10) Patent No.: US 11,866,617 B2
(45) Date of Patent: Jan. 9, 2024

(54) VERY HIGH SOLIDS, THERMOSET COMPOSITION WITH ONE-SIDE (WET SET) ADHESION TO UNPRIMED/UNMODIFIED TPO SURFACES

(71) Applicant: Franklin International, Inc., Columbus, OH (US)

(72) Inventors: John William Duffy, Hatboro, PA (US); Mark A. Vrana, Lancaster, OH (US); Tanzin Fatima, Philadelphia, PA (US)

(73) Assignee: Franklin International, Inc., Columbus, OH (US)

( * ) Notice: Subject to any disclaimer, the term of this patent is extended or adjusted under 35 U.S.C. 154(b) by 429 days.

(21) Appl. No.: 17/291,886

(22) PCT Filed: Feb. 5, 2020

(86) PCT No.: PCT/US2020/016691
§ 371 (c)(1),
(2) Date: May 6, 2021

(87) PCT Pub. No.: WO2020/163413
PCT Pub. Date: Aug. 13, 2020

(65) Prior Publication Data
US 2022/0002598 A1    Jan. 6, 2022

Related U.S. Application Data

(60) Provisional application No. 62/801,298, filed on Feb. 5, 2019.

(51) Int. Cl.
| | | |
|---|---|---|
| *C09J 175/04* | (2006.01) | |
| *C09J 5/00* | (2006.01) | |
| *C09J 11/04* | (2006.01) | |
| *C09J 11/06* | (2006.01) | |
| *E04D 5/14* | (2006.01) | |
| *E04B 1/62* | (2006.01) | |
| *E04F 19/04* | (2006.01) | |

(52) U.S. Cl.
CPC .............. *C09J 175/04* (2013.01); *C09J 5/00* (2013.01); *C09J 11/04* (2013.01); *C09J 11/06* (2013.01); *E04D 5/148* (2013.01); *C09J 2423/00* (2013.01); *C09J 2423/008* (2013.01); *C09J 2475/00* (2013.01); *E04B 1/625* (2013.01); *E04F 19/0477* (2013.01)

(58) Field of Classification Search
CPC ... C09J 175/04; C09J 5/00; C09J 11/04; C09J 11/06; C09J 2423/00; C09J 2423/008; C09J 2475/00; E04B 1/625; E04D 5/148; E04F 19/0477
USPC ........................................................ 156/333
See application file for complete search history.

(56) References Cited

U.S. PATENT DOCUMENTS

| | | | |
|---|---|---|---|
| 7,378,482 B2 * | 5/2008 | Asch ...................... | C08G 77/12 528/33 |
| 2009/0005478 A1 | 1/2009 | Gelbin et al. | |
| 2010/0317796 A1 | 12/2010 | Huang et al. | |
| 2013/0338277 A1 | 12/2013 | Tashimoto et al. | |
| 2014/0348776 A1 | 11/2014 | Palmer, Jr. et al. | |

FOREIGN PATENT DOCUMENTS

| | | |
|---|---|---|
| WO | 2015076440 A1 | 5/2015 |

OTHER PUBLICATIONS

Korean Patent Office, The International Search Report and The Written Opinion of the International Searching Authority, dated Jun. 10, 2020, for International Application No. PCT/US2020/016691.

\* cited by examiner

*Primary Examiner* — James D Sells
(74) *Attorney, Agent, or Firm* — Design IP

(57) ABSTRACT

Adhesive compositions are described that are suitable for securing building materials, such as TPO membrane roofing to a structural element, such as a roof deck. The adhesive compositions are very high-solids, wet-set adhesives that provide a peel strength that meets or exceeds industry standards, while requiring application to only one of two surfaces to be joined. The adhesive compositions comprise a liquid modifier with hydroxyl functionality, a chlorinated polyolefin and a silylated polymer. Methods of use are also disclosed.

20 Claims, No Drawings

VERY HIGH SOLIDS, THERMOSET COMPOSITION WITH ONE-SIDE (WET SET) ADHESION TO UNPRIMED/UNMODIFIED TPO SURFACES

BACKGROUND

Modern commercial and institutional roofing, as well as some residential low-slope roofing, is covered for long-term weather resistance by plastic or rubber membranes commonly called "single ply." These roof materials last without roof leakage for up to 20 years or more. These membranes have largely replaced the old methods of "built-up roofing" (BUR) with its hot asphalt applications.

The rubber membranes are rolled out on the roof during installation. In order to prevent the membranes from being lifted and blown away by strong storms, the membranes were commonly bonded to the structure along the perimeter of the membrane, and/or weighed down with gravel. At times, bonding the membrane along the perimeter provided insufficient protection and the use of gravel made for heavier roofs and more expensive installation. Additionally, gravel is normally dark in color, which is an unfavorable reflective property because it promotes heat retention.

For at least the last 10 years, there has been a movement in the architectural community and in government to specify "white roof" which reflects sunlight. In large buildings, the benefits of white roof on air conditioning loads have to be balanced against reduced solar heating benefit in heating months. However, in the USA, the net benefit is for white roofing in about 90% of the population. This has further moved the roofing market to white products such as thermoplastic olefin (TPO) and polyvinyl chloride (PVC). It is estimated that 50% of the commercial/institutional roof membrane market is now served by TPO, which has special cost advantages due to the ready availability of the monomer olefins used to make it.

Concern over climate change and increasing severity of storms has started to have an influence on roof construction. For this reason, commercial building insurers have started to mandate that all roofing membranes be fully bonded across the entire roof, not just at seams and perimeters. TPO presents a particular challenge in this regard because it is the most difficult of all of the available roofing materials to secure with adhesives. The plastics from which TPO is made—polypropylene and ethylene-propylene rubber—are very difficult for adhesives to wet out on, and they provide very little in bonding sites for adhesive molecules to affect a bond. "Wetting out" means the adhesive flows and covers a surface to maximize the contact area and the attractive forces between the adhesive and bonding surface. In some applications, polyethylene or polypropylene are bonded with pressure-sensitive adhesives, which are very soft and deformable, and which are thermoplastic, meaning they have very limited resistance to temperature variation. This temperature variation is not acceptable on a typical roof, which has very wide temperature fluctuations and is subject to the uplifting force of wind.

Common existing bonding methods for TPO roofing membranes are with contact cements based on polychloroprene. These contact cements are chemically-reacting (thermoset) materials that are applied to two surfaces which are then allowed to dry. Once dry, the two coated surfaces are then mated. This presents an installation challenge because the rolls of TPO membrane are typically 10 feet wide and 100 feet long. Older contact cement technology is rendered as solvent solutions of the solid polychloroprene with appropriate tackifier resins, curatives and fillers. The solvents are restricted in many parts of the US for their very high VOC (volatile organic chemical) components, and so manufacturers of solvent-based materials try to replace the solvents with other solvents that are considered VOC-exempt. Unfortunately, the VOC-exempt solvents are not very effective with polychloroprene and many of the solvents themselves have problems with flammability or human health.

The adhesives industry has been developing water-based contact cements. These can be very effective in climate-controlled conditions, but they have problems with freezing and condensation of water vapor in many parts of the country. In some parts of the country, such as the northeast, solvent-based contact adhesives are not permitted due to VOC's, but the water-based contact products cannot be used for up to six months of the year due to freezing concerns. Hence, TPO installation can be severely limited during certain time periods in certain geographies. The roofing industry has developed installation techniques to accommodate the two-side application required for contact cements. However, it is still a process that takes more time and labor than desired to apply adhesive to two, not one, surfaces, and to wait for the adhesive to dry.

A broader range of thermoset adhesive can be used if the TPO in manufacturing is mounted with an adhesive-compatible surface called fleeceback. However, this TPO with fleeceback membrane is substantially more expensive to produce than ordinary TPO. Alternatively, an installer can apply a primer to conventional TPO, and then use a non-contact cement adhesive. However, this technique still requires two-side application (one primer, one adhesive) and drying time for the primer.

There is an unmet need in the field for a high solids content (non-VOC), thermoset adhesive that can be applied to only one side of unmodified/unprimed TPO roofing membrane. The adhesive must meet or exceed industry standards for adhesive strength and be able to be used over a wide range of temperature and humidity conditions. The adhesive must be cost comparable to existing technologies and ideally, be suitable for use on a variety of building materials in addition to TPO.

SUMMARY

The adhesive technology disclosed herein provides a very high solids (greater than 95 percent by weight) adhesive, capable of one-sided application, and with outstanding adhesion, to unprimed and unmodified TPO. It is based on a moisture-curing liquid polymer, making it a thermoset adhesive with wide temperature range capability. It is not water-based and therefore does not have the restrictions for transportation or outdoor use that water-based contact cements do. It has favorable adhesive properties when used with other building materials, such as Tyvek and rubber membranes.

DETAILED DESCRIPTION OF THE INVENTION

The following disclosure is presented to provide an illustration of the general principles of the present invention and is not meant to limit, in any way, the inventive concepts contained herein. Moreover, the particular features described in this section can be used in combination with the other described features in each of the multitude of possible permutations and combinations contained herein.

All terms defined herein should be afforded their broadest possible interpretation, including any implied meanings as dictated by a reading of the specification as well as any words that a person having skill in the art and/or a dictionary, treatise, or similar authority would assign particular meaning. Further, it should be noted that, as recited in the specification and in the claims appended hereto, the singular forms "a," "an," and "the" include the plural referents unless otherwise indicated herein or clearly contradicted by context. Additionally, the terms "comprises," "comprising," "having," "including, "containing," are to be construed as open-ended terms (i.e., meaning "including, but not limited to,") unless otherwise noted.

The following disclosure is intended to be read in connection with the accompanying drawings, which are to be considered part of the entire written description of the invention. The drawing figures are not necessarily to scale and certain features of the invention may be shown exaggerated in scale or in somewhat schematic form in the interest of clarity and conciseness. In this description, relative terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing FIGURE under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both moveable or rigid attachments or relationships, unless expressly described otherwise, and includes terms such as "directly" coupled, secured, etc. The term "operatively coupled" is such an attachment, coupling, or connection that allows the pertinent structures to operate as intended by virtue of that relationship.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

"Substantially free" is defined herein as less than 0.001 wt. percent. "Substantially free" also includes 0.000 wt. percent. The term "free of" means 0.000 wt. percent. As used herein, "about" is intended to correspond to within 5 percent of the stated value.

In all such compositions, wherein specific components of the composition are discussed in reference to weight percentage ranges including a zero lower limit, it will be understood that such components may be present or absent in various specific embodiments of the composition, and that in instances where such components are present, they may be present at concentrations as low as 0.001 weight percent, based on the total weight of the composition in which such components are employed. All amounts are weight percents, unless otherwise specified. All weight percents are based on the total composition, that is a total of 100%.

All references, including publications, patent applications, and patents, cited herein are hereby incorporated by reference to the same extent as if each reference were individually and specifically indicated to be incorporated by reference and were set forth in its entirety herein.

The present invention relates generally to adhesive compositions for securing building materials, such as membrane roofing, to a structure. The adhesive composition is useful for adhering adhesion-resistant materials, such as TPO, with a strength meeting or exceeding industry standards. The adhesive composition need only be applied to one of two surfaces being bonded. The adhesive composition comprises: at least one liquid modifier with hydroxyl functionality, represented by the general formula R—OH, wherein R represents a hydrocarbon; at least one polyolefin polymer, and at least one silylated polymer. Particularly suitable liquid modifiers with hydroxyl functionality are styrenated phenols.

The compositions disclosed herein exhibit excellent ability to secure roofing membranes, including TPO, to a roof deck. The compositions need only be applied to one of two surfaces being bonded, result in an adhesive strength meeting or exceeding the industry standard of 5 pounds per inch, and the surfaces can be joined while the adhesive composition is still wet (wet-set).

The headings employed herein are not intended to be limiting; rather, they are included for organizational purposes only.

Liquid Modifier with Hydroxyl Functionality

The term "liquid modifier with hydroxyl functionality," as used herein means any hydrocarbon with hydroxyl functionality that is in the liquid phase at 23 degrees Celsius. The hydroxyl functionality may be phenolic or non-phenolic.

Unlike prior art adhesive compositions based on solid resins, the formulations of claimed invention comprise a modifier with hydroxyl functionality that is a liquid at room temperature (23 degrees Celsius). Preferably, the liquid modifier remains in the liquid phase over the temperature range encountered during summer and winter outdoor construction seasons.

The liquid modifier with hydroxyl functionality is represented by the general formula (1)

$$R\text{—}OH \tag{1}$$

wherein R represents a hydrocarbon.

In a preferred embodiment, the liquid modifier with hydroxyl functionality is a styrenated phenol. The styrenated phenol is represented by the general formula (2)

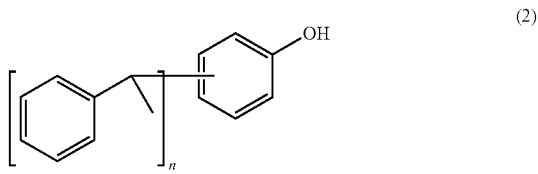

wherein n=1, 2 or 3. Suitable styrenated phenols include, but are not limited to, monostyrenated phenols, 2,4-distyrenated phenols, 2,6-distyrenated phenols, tristyrenated phenols, methyl styrenated phenols and combinations thereof. A preferred liquid modifier with hydroxyl functionality is tristyryl phenol.

In another embodiment, the liquid modifier with hydroxyl functionality is a non-styrenated compound with phenolic hydroxyl functionality. Preferred liquid modifiers with phenolic hydroxyl functionality include, but are not limited to, cardanol, cardanol polyols and copolymer polyols containing cardanol, cardanol polyols chain extended with diisocyanate, nonyl phenol, dodecyl phenol, and combinations thereof. As used herein, "cardanol" means a phenolic lipid obtained from anacardic acid, the main component of cashew nutshell liquid, a byproduct of cashew nut processing.

In a preferred embodiment the liquid modifier with hydroxyl functionality indene-coumarone resin. A preferred indene-coumarone resin is commercially available as Novares/Rutgers CA 80LS 500.

In another embodiment, the liquid modifier with hydroxyl functionality is a compound with non-phenolic hydroxyl functionality. Preferred liquid modifiers with non-phenolic hydroxyl functionality include, but are not limited to, propylene glycol phenyl ether, tri(propylene glycol) butyl ether, phenyl ethanol, ethyl hexanediol, polybutadiene polyols, castor oil polyols, soybean oil polyols and combinations thereof.

In embodiments of the adhesive composition that are a "filled" formulation, that is, where a filler is present, the liquid modifier with hydroxyl functionality ranges from 5 to 40 percent by weight of the adhesive composition, more preferably from 12 to 25 percent by weight of the adhesive composition.

Polyolefin Polymer

The adhesive composition comprises at least one polyolefin polymer. The term polyolefin polymer, as used herein, is any of a class of polymers produced from a simple olefin (also called an alkene with the general formula $C_nH_{2n}$) as a monomer. Suitable polyolefin polymers include, but are not limited to, a chlorinated polyolefin, a grafted maleated polyolefin polymer or combinations thereof. A preferable polyolefin polymer is chlorinated polyolefin.

In embodiments of the adhesive composition where a filler is present, the polyolefin polymer ranges from 1 to 22 percent by weight of the adhesive composition, more preferably from 3 to 15 percent by weight of the adhesive composition.

Silylated Polymer

The adhesive composition comprises at least one silylated polymer. As used herein, the term "silylated polymer," also known as silane-modified polymers, modified-silane polymers, or silane terminated polymers, are polymers terminating with a silyl group. The silylated polymer is preferably a urethane polymer. Suitable silylated polymers include, but are not limited to silylated polyether urethanes, silylated butadiene urethanes, silylated cashew nut polyols, silylated castor bean polyols. In a preferred embodiment the silylated urethane polymer has an average molecular weight greater than 10,000. A preferred silylated polymer is silylated polyether urethane.

In embodiments of the adhesive composition where a filler is present, the silylated polymer comprises from 10 to 60 percent by weight of the adhesive composition, more preferably from 13 to 18 percent by weight of the adhesive composition.

Other Ingredients

The adhesive composition may also contain, as appropriate, crosslinking agents, desiccants, fillers, colorants, flame retardants, catalysts and fillers. The adhesive composition may, optionally, contain tackifying resins and/or adhesion promoters.

As used herein, the term "crosslinking agent" means any agent that promotes the process of forming covalent bonds or relatively short sequences of chemical bonds to join two polymer chains together.

Suitable desiccants for use with the adhesive composition include but are not limited to desiccant silanes. A preferred desiccant is vinyl trimethoxy silane. When present, in embodiments of the adhesive composition where a filler is present, the desiccant preferably comprises from 1 to 3 percent by weight of the adhesive composition.

Suitable fillers for use with the adhesive composition include, but are not limited to precipitated calcium carbonate, ground calcium carbonate, silica, plastic microballoons, clay, fumed silica, and talc. A preferred filler is precipitated calcium carbonate. When present, the filler preferably comprises from 0 to 60 percent by weight of the adhesive composition.

Suitable catalysts for use with the adhesive composition include, but are not limited to, curing catalysts comprising tin. A preferred catalyst is dibutytin dilaurate. When present, in embodiments of the adhesive composition where a filler is present, the catalyst preferably comprises from 0.03 to 5 percent by weight of the adhesive composition.

Suitable solvents for use with the adhesive composition include, but are not limited to xylene, toluene and combinations thereof. A preferred solvent is xylene. When present, in embodiments of the adhesive composition where a filler is present, the solvent preferably comprises from 0 to 10 percent by weight of the adhesive composition, more preferably from 0 to 5 percent.

Formulation Profiles

Embodiments of the present invention include different formulation profiles, for example a filled adhesive formula that is suitable for application with a trowel, by extrusion or by airless spray. In embodiments of the invention, spray application may be done with an unfilled formulation.

Method of Making the TPO Adhesive

In an embodiment, he method of making the TPO adhesive of the present invention preliminarily comprises the preparation of a silane endcap that is used to synthesize a silane terminated prepolymer (a silylated polymer). Separately, a polyolefin polymer solution is prepared. The silane terminated prepolymer, polyolefin solution, liquid modifier with hydroxyl functionality and other ingredients, as specified above, are then combined to prepare the TPO adhesive. The nature and quantity of other ingredients will vary with the desired formulation profile. The individual steps and ingredients for an embodiment of formulation are described in more detail below. These steps and quantities described below are intended to illustrate an embodiment of the invention and not to limit the methods, ingredients, order of steps or conditions used. One of skill in the art will recognize that alternative steps and conditions may be employed with equal or greater success.

Preparation of Silane Endcap

A suitable silanizing agent is added to a reactor or vessel. As used herein, a silanizing agent is a compound useful for functionalization of surfaces with alkoxysilane molecules. Any suitable silanizing agent know in the art may be used. A preferred silanizing agent is 3-aminopropyl trimethoxy silane. The reactor is then heated to a temperature of between 20 and 26 degrees Celsius, more preferably between 21 and 25 degrees Celsius, most preferably between 22 and 24 degrees Celsius. Cooling water is used to maintain the temperature of the reactor.

A suitable monomer is then slowly added the reactor. Suitable monomers include alkyl acrylates and alkyl maleates. A preferred monomer is dioctyl maleate. In a preferred embodiment, the monomer is added such that the weight percent of monomer in the combined monomer and silanizing agent mixture ranges from 55 to 75 percent, preferably from 60 to 70 percent, most preferably from 63 to 68 percent. In a preferred embodiment, the silanizing agent ranges from 25 to 45 percent, more preferably from 30 to 40 percent, most preferably from 32 to 37 percent by weight of the combined monomer and silanizing agent mixture. The mixture is then mixed for one hour to form a silane endcap and the peak exotherm temperature is recorded. A sample of the silane endcap is analyzed using Fourier Transform Infrared Spectroscopy (FTIR) to verify that the spectrum matches a preselected control sample.

The silane endcap is then filled into lined drums and the drums are purged with dry nitrogen. The silane endcap is stored in the drums for at least two days before use in prepolymer synthesis.

Synthesis of a Silane Terminated Prepolymer

In an embodiment, the silane-terminated prepolymer is synthesized according to the following steps.

Charge to a mixer or reactor a quantity of polyether polyol (Covestro Acclaim 4200) equal to about 71.7 percent by weight of the final prepolymer formulation. Bring the temperature, under vacuum, with mixing, to 71 degrees Celsius, plus or minus 3 degrees Celsius. A preferred vacuum is 40 mm Hg. One of skill in the art will understand that the length of vacuum mixing will depend on the measured water content after the 71 Celsius temperature has been achieved, and the water content sample taken.

Measure the water content of the formulation by Karl Fischer titration. The water content must be at or below 0.05 percent by weight maximum. If the water content is above 0.05 percent by weight, the vacuum must be maintained at 68 to 74 degrees Celsius until a water content of 0.05 percent or below is achieved.

When an acceptable water content has been achieved, a quantity of monomeric diphenylmethane diisocyanate (Covestro Mondur MLQ) equal to about 6.2 percent by weight of the final prepolymer composition and a quantity of xylene equal to about 7.2 percent by weight of the final prepolymer composition is added to the reactor. The temperature of the reactor is then brought to 71 degrees Celsius, plus or minus 3 degrees Celsius.

A quantity of a bismuth catalyst (Vertellus Coscat 83) equal to about 0.03 percent by weight of the final prepolymer composition is then added to the reactor. The reactor is then closed with the formulation inside. After the initial exotherm, the temperature of the reactor is held at 68 to 74 degrees Celsius for three hours. After three hours, the isocyanate content (percent NCO) is measured by titration. The preferred NCO is less than 0.8 percent by weight, more preferably about 0.71 percent by weight. If a higher NCO measurement is obtained the reaction must be continued at 68 to 74 degrees Celsius until the preferred NCO is achieved.

Once the preferred NCO is achieved, a quantity of silane endcap is added to the formulation. The quantity of silane endcap is calculated to be about 10.5 times the percent NCO, preferably about 7.4 percent by weight of the final prepolymer formulation. The formulation is then mixed for one hour at 68 to 74 degrees Celsius. After the mixing is complete, a quantity of vinyltrimethoxy silane equal to about 0.3 percent by weight of the final prepolymer composition and a quantity of xylene equal to about 7.2 percent by weight of the final prepolymer composition is added to the reactor. The prepolymer composition in the reactor is then filled into drums under an atmosphere of dry nitrogen.

Chlorinated Polyolefin Solution Preparation

In a preferred embodiment, the chlorinated polyolefin solution is prepared by mixing a chlorinated polyolefin (Advanced Polymer Hardlen DX-530P) with xylene at a temperature below 50 degrees Celsius until the CPO is completely dissolved. Preferably, the CPO will comprise about 40 percent by weight of the solution and xylene will comprise about 60 percent by weight of the solution.

TPO Adhesive Preparation

In a preferred embodiment, the TPO adhesive is prepared according the following procedure, but other procedures may also be followed as will be understood by one skilled in the art. The process is begun by charging the following ingredients to a vacuum-capable, jacketed tank for a high-speed disperser: the liquid modifier with hydroxyl functionality (Novares LS 500 about 19.7 percent by weight of the final adhesive composition); filler comprising precipitated calcium carbonate (Specialty Minerals Super-Pflex 100 at 25.3 percent and Specialty Minerals Hi-Pflex 100 at 25.3 percent by weight of the final adhesive composition); and antioxidant (SI Group Ethanox 310 at 0.1 3 percent by weight of the final adhesive composition).

The ingredients are then mixed in the tank under a vacuum at 70 to 90 degrees Celsius for two hours. A preferred vacuum is 40 mm Hg. One of skill in the art will understand that the length of vacuum mixing will depend on the measured water content after the 71 Celsius temperature has been achieved, and the water content sample taken. The water content of the mixture is measured by Karl Fischer titration. Preferably, the water content must be less than 0.1 percent by weight (1000 ppm). If the measured water content is too high, mixing under vacuum must continue until the preferred water content is reached. When the preferred water content is reached, the tank temperature is reduced to below 60 degrees Celsius.

A quantity of vinyltrimethoxy silane equal to about 2.0 percent by weight of the final adhesive composition is then added to the tank and the tank is mixed for 15 minutes. Then, a quantity of the silane-terminated prepolymer, prepared as described above, equal to about 21.0 percent by weight of the final adhesive composition is added to the tank and the tank is mixed for 15 minutes under vacuum at temperature below 60 degrees Celsius.

Then, the following ingredients are added to the tank: a diamino functional silane (preferably 3-(2-aminoethylamino)propyl trimethoxysilane at about 1.9 percent by weight of the adhesive composition); a filler (preferably AkzoNobel Expancel 551 DE 40 d42) at about 0.3 percent by weight of the adhesive composition; the chlorinated polyolefin solution, prepared as described above, at about 4.1 percent by weight of the adhesive composition; and an organotin catalyst (preferably Reaxis C218 at about 0.3 percent by weight of the adhesive composition. The tank is then mixed for 15 minutes to thoroughly combine the components of the formulation.

Methods of Use

The adhesive compositions disclosed herein are useful for securing building materials to structural elements of a building. As used herein the term "building material" means any type of covering, cladding, siding, insulation, roofing material or the like, that is attachable to a structural element of a building. As used herein the term "structural element" means a support or surface of a structure such as a stud, wall, beam, deck and the like.

A significant advantage of the adhesive composition according to embodiments of the present invention is that they enable methods of application wherein the adhesive need only be applied to one of two surfaces to be joined together, and the surfaces may be joined while the adhesive composition is still wet. In prior art methods, particularly for building materials such as TPO, that are difficult to adhere, an adhesive must be applied to both of two surfaces to be joined, and the adhesive must be allowed to dry before the two surfaces are joined together.

For example, in an embodiment of the disclosed invention, a method for installing membrane roofing to a roof deck, comprises: applying the disclosed adhesive composition to one or the other of the upper surface of a roof deck or the lower surface of a roof membrane while leaving the other surface untreated. The roof membrane is then installed onto the roof deck while the adhesive composition is still wet, so that the lower surface of the roof membrane contacts the upper surface of the roof deck. Suitable roof membranes for embodiments of the methods disclosed herein are ethylene propylene diene monomer (EDPM) membranes, thermoplastic olefin (TPO) membranes and polyvinyl chloride (PVC) membranes. A preferred roof membrane is TPO membrane.

Embodiments of the disclosed invention include a method wherein, after the roof membrane is installed onto the roof deck, the adhesive composition is allowed to dry for a period of time sufficient to achieve an adhesive peel strength greater than five pounds per inch as determined by test method ASTM D903-98(2017).

Embodiments of the disclosed invention include methods for installing building materials other than membrane roofing onto a structural member of a building. Such methods comprise applying the disclosed adhesive composition to only one of an exterior surface of a structural member or an interior surface of a building material to be adhered to the structural member, while leaving the other surface untreated. The building material is then installed onto the structural member while the adhesive composition is still wet so that the interior surface of the building material contacts the exterior surface of the structural member. Suitable building materials for the disclosed method include, but are not limited to polyolefin house wrap, polyvinyl chloride trim boards, composite trim boards, composite decking materials, flashing membranes and the like.

EXAMPLES

Working examples are provided as described below and in Tables 1 through 16. Table 17 provides explanation of the trade names used to refer to components of the composition throughout the Examples and disclosure. Adhesive strength testing results are provided in the Examples and Tables. Peel tests were performed following ASTM C794-18. In the Tables, the type of failure is listed as adhesive failure (AF) or cohesive failure (CF).

Example 1—Disclosed Formulation Compared to Prior Art Adhesive on TPO Membrane

A working example of a TPO adhesive was prepared according to the method disclosed above with the composition listed in Table 1. Peel strength testing was performed on the composition of Example 1-1, as well as a prior art TPO Adhesive (Kawakami patent U.S. Pat. No. 7,759,425) for comparison. Adhesive strength testing was performed using a Johns Manville TPO membrane. Exterior-grade plywood was used as the substrate. Adhesive was applied to the plywood and then TPO was applied within 60 seconds. This was a single-side or "wet set" application. The adherends were mated by pressing the edge of a spatula to the bond area and drawing the spatula the length of the bonded specimen with light hand pressure. Both adhesives were done the same way. Cure time was two weeks at 23 degrees Celsius and 50 percent relative humidity.

TABLE 1

Example 1 Composition.

| Component | Ex 1-1 (wt %) |
|---|---|
| Hardlen DX 530 P (CPO) | 3.25 |
| Xylene | 6.46 |
| VTMO (desiccant silane) | 1.44 |
| Novares LS 500 (styrenated phenol #1) | 20.73 |
| Super Pflex (0.7 micron PCC) | 50.20 |
| Acclaim 4200/MDI Polymer (Silylated polymer) | 15.84 |
| DAMO (diamino functional silane) | 1.82 |
| DBTDL (catalyst) | 0.27 |
| Total weight of composition | 100.00 |

The results of the strength testing are provided in Table 2. Modulus, ultimate strength and elongation testing were performed by ASTM D412-16. Shore A is hardness by ASTM C661-15. Peel is by ASTM C794-18.

TABLE 2

Strength Testing Results of Example 1 versus Prior Art TPO Adhesive.

| | Prior Art TPO Adhesive | Ex. 1-1 |
|---|---|---|
| After 2 week at constant Temp-room | | |
| Elongation (%) | 254 | >674 |
| Ultimate St (psi) | 127 | >91 |
| 100% Modulus (psi) | 74 | 35 |
| Shore A | 35 | 20 |
| JM TPO Peel (lb) | 0.64 | 16.1 |
| Failure Type | AF | CF |
| After 2 weeks at CTR + 2 week at 140 F./100% Humidity | | |
| JM TPO Peel (lb) | 1.44 | 11.70 |
| Failure Type | 75% AF/25% CF | CF |

The results in Table 2 show that formulations of present invention provide superior adhesive performance over the prior art adhesive when applied to a TPO membrane. The TPO peel strength of the inventive adhesive is greatly improved over the prior art adhesive and within acceptable industry standards. For example, the internal specification normally used for TPO adhesives by at least two manufacturers of such products is a minimum of 5.0 lbs.

Example 2—Performance of Formulations on TPO and EDPM Membranes Compared

Two working examples were prepared combining CPO with other materials to test the effect of the combinations on the adhesiveness to unprimed TPO as well as EDPM.

Formulation Ex 2-1 included a mixture of styrenated phenol and methyl styrenated phenol, while Ex 2-4 included a commercially available blend of styrenated phenol (Novares/Rutgers CA 80LS 500).

TABLE 3

Example 2 Formulations.

| Component | Ex 2-1 (wt. %) | Ex. 2-2 (wt. %) |
|---|---|---|
| Styrenated phenol w/Methyl Styrenated phenol | 22.95 | 0.0 |
| Styrenated phenol #1 | 0.0 | 22.95 |
| 0.7 micron PCC | 44.70 | 44.70 |
| VTMO | 1.30 | 1.30 |
| Liquid Chlorinated Paraffin | 2.51 | 2.51 |
| Silylated Polymer | 14.28 | 14.28 |
| DAMO | 1.69 | 1.69 |
| Plastic Microballoon | 0.24 | 0.24 |
| Xylene | 7.25 | 7.25 |
| CPO | 4.83 | 4.83 |
| DBTDL | 0.24 | 0.24 |
| Total | 100.00 | 100.00 |

The formulations of Ex. 2-1 and Ex 2-2 were tested using a similar procedure as described in Example 1. Both formulations were tested on TPO and EPDM membranes. The results are shown in Table 4 and demonstrate that relatively low concentrations of CPO provide good adhesion to TPO, while also providing reasonable adhesion on other substrates, such as EPDM.

TABLE 4

Strength Testing Results of Example 2.

| Parameter | Ex. 2-1 | Ex. 2-4 |
|---|---|---|
| JM TPO Peel (lb) | 15.80 | 19.60 |
| Failure Type (Adhesive/Cohesive) | (CF) | (CF) |
| JM EPDM Peel (lb) | 3.00 | 4.05 |
| Failure Type (Adhesive/Cohesive) | (AF) | (AF) |

Example 3—Variation of CPO Concentration

Working examples of adhesive formulations according to the present invention were prepared with varied concentrations of CPO to demonstrate the effect on the adhesive properties when applied to different types of substrates. Formulations were prepared according to TABLE 5.

TABLE 5

Formulations of Example 3.

| Component | Ex. 3-1 (wt %) | Ex. 3-2 (wt. %) | Ex.3-3 (wt. %) | Ex. 3-4 (wt. %) |
|---|---|---|---|---|
| Styrenated phenol #1 | 25.07 | 24.12 | 22.95 | 21.65 |
| 0.7 micron PCC | 48.83 | 46.97 | 44.70 | 42.15 |
| VTMO | 1.43 | 1.37 | 1.30 | 1.23 |
| Liquid Chlorimated Paraffin | 2.74 | 2.64 | 2.51 | 2.37 |
| Silylated Polymer | 15.60 | 15.00 | 14.28 | 13.47 |
| DAMO | 1.85 | 1.78 | 1.69 | 1.59 |
| Plastic Microballoon | 0.26 | 0.25 | 0.24 | 0.23 |
| Xylene | 2.38 | 4.57 | 7.25 | 10.25 |
| CPO | 1.58 | 3.05 | 4.83 | 6.84 |
| DBTDL | 0.26 | 0.25 | 0.24 | 0.23 |
| Total | 100 | 100 | 100 | 100 |

The formulations of Example 3 were tested using a similar procedure as described in Example 1. All formulations were tested on TP, EPDM and two types of PVC membranes. The results are shown in Table 6.

TABLE 6

Strength Testing Results of Example 3.

| Parameter: | Ex. 3-1 | Ex. 3-2 | Ex.3-3 | Ex. 3-4 |
|---|---|---|---|---|
| JM TPO Peel (lb) | 13.40 | 11.30 | 11.20 | 6.75 |
| Failure Type (Adhesive/Cohesive) | CF | CF | CF | Mostly CF |
| JM EPDM Peel (lb) | 6.44 | 5.62 | 5.96 | 4.05 |
| Failure Type (Adhesive/Cohesive) | CF | 50/50: AF/CF | CF | AF |
| JM PVC KEE Peel (lb) | 10.80 | 3.00 | 8.50 | 6.67 |
| Failure Type (Adhesive/Cohesive) | CF | CF | CF | CF |
| JM PVC SD Plus Peel (lb) | 10.00 | 9.03 | 6.30 | 3.75 |
| Failure Type (Adhesive/Cohesive) | CF | Mostly thin film | Severe wood failure/CF/ Thin film | Severe wood failure/CF/ Thin film |

The results of Example 3 demonstrate that low levels of CPO in formulations with styrenated phenol #1 are useful as a general purpose unprimed wet set adhesive, because favorable adhesive properties were obtained on different types of substrates. In general, lower concentrations of CPO yielded formulations with more favorable adhesive properties regardless of substrate type.

Example 4—Variation of Polymer Type

Working examples of adhesive formulations according to the present invention were prepared with different polymers to demonstrate their effectiveness in the formulations of the invention. Formulations were prepared according to TABLE 7.

TABLE 7

Formulations of Example 4.

| Component | Ex. 4-1 (wt %) | Ex. 4-2 (wt %) | Ex. 4-3 (wt %) |
|---|---|---|---|
| Styrenated phenol #1 | 20.27 | 20.27 | 20.27 |
| Risun silated Polymer | 17.84 | 0.0 | 0.0 |
| Kaneka Reference Polymer (Dimethoxy silyl-terminated polyether) | 0.0 | 17.84 | 0.0 |
| NPT High Strength #1 (Trimethoxy silyl-terminated polyurethane) | 0.0 | 0.0 | 17.84 |
| 0.7 micron PCC | 50.00 | 50.00 | 50.00 |
| VTMO | 1.35 | 1.35 | 1.35 |
| DAMO | 1.89 | 1.89 | 1.89 |
| Plastic Microballoon | 0.27 | 0.27 | 0.27 |
| Xylene | 4.86 | 4.86 | 4.86 |

TABLE 7-continued

Formulations of Example 4.

| Component | Ex. 4-1 (wt %) | Ex. 4-2 (wt %) | Ex. 4-3 (wt %) |
|---|---|---|---|
| CPO | 3.24 | 3.24 | 3.24 |
| DBTDL | 0.27 | 0.27 | 0.27 |
| Total | 100.00 | 100 | 100.00 |

The formulations of Example 4 were tested on TPO membranes using a similar procedure as described in Example 1. The results are shown in Table 8.

TABLE 8

Strength Testing Results of Example 4.

| Parameter | Ex. 4-1 (wt %) | Ex. 4-2 (wt %) | Ex. 4-3 (wt %) |
|---|---|---|---|
| Elongation (%) | 599 | 505 | 173 |
| Ultimate St (psi) | 93 | 67 | 107 |
| 100% Modulus (psi) | 35 | 34 | 88 |
| Shore A | 20 | 21 | 46 |
| JM TPO Peel (lb) | 11.90 | 9.50 | 6.82 |
| Failure Type | CF | CF | CF/Some thin film |

The results of Table 8 demonstrate that trimethoxy polymers and dimethoxypolymers perform well in the formulation of the present invention.

Example 5—Variation of Polymers and Performance on EDPM and TPO Membranes

Working examples of adhesive formulations according to the present invention were prepared with different polymers to demonstrate their effectiveness in the formulations of the invention on EDPM and TPO membranes. Formulations were prepared according to TABLE 9.

TABLE 9

Formulations of Example 5.

| Component | Ex. 5.0 (wt %) | Ex. 5.1 (wt %) | Ex. 5.2 (wt %) | Ex. 5.3 (wt %) | Ex. 5.4 (wt %) | Ex. 5.5 (wt %) |
|---|---|---|---|---|---|---|
| Styrenated phenol #1 | 11.92 | 5.49 | 16.48 | 5.49 | 11.61 | 16.48 |
| Rosin Ester tackifier resin | 9.02 | 14.68 | 4.57 | 0.0 | 0.0 | 0.0 |
| C5/C9 Tackifier resin | 0.0 | 0.0 | 0.0 | 14.68 | 9.01 | 4.57 |
| Xylene | 7.05 | 8.71 | 5.46 | 8.71 | 6.88 | 5.46 |
| 0.7 micron PCC | 50.56 | 49.57 | 51.23 | 49.57 | 50.53 | 51.23 |
| VTMO | 1.48 | 1.45 | 1.50 | 1.45 | 1.48 | 1.50 |
| Silylated Polymer | 15.88 | 16.08 | 16.62 | 16.08 | 16.39 | 16.62 |
| DAMO | 1.91 | 1.88 | 1.94 | 1.88 | 1.91 | 1.94 |
| Plastic Microballoon | 0.27 | 0.27 | 0.28 | 0.27 | 0.27 | 0.28 |
| CPO | 1.64 | 1.61 | 1.66 | 1.61 | 1.64 | 1.66 |
| DBTDL | 0.27 | 0.27 | 0.28 | 0.27 | 0.27 | 0.28 |
| Total | 100 | 100 | 100 | 100 | 100 | 100 |

The formulations of Example 5 were tested on TPO and EDPM membranes using a similar procedure as described in Example 1. The results are shown in Table 10.

TABLE 10

Strength Testing Results of Example 5.

| Parameter | Ex. 5.0 | Ex. 5.1 | Ex. 5.2 | Ex. 5.3 | Ex. 5.4 | Ex. 5.5 |
|---|---|---|---|---|---|---|
| Elongation (%) | >676 | >674 | >680 | 624 | >679 | >679 |
| Ultimate St (psi) | >120 | >167 | >121 | 194 | >130 | >158 |
| 100% Modulus (psi) | 44 | 55 | 38 | 68 | 38 | 45 |
| Shore A | 33 | 26 | 25 | 30 | 30 | 25 |
| JM TPO Peel (lb) | 25.90 | 10.6 | 16 | 14.2 | 10 | 9 |
| Failure Type | CF/wood fail | 60% CF/40% AF/severe wood fail | CF/severe wood fail | 90% CF/10% AF/severe wood fail | CF/Slight wood fail | CF/moderate wood fail |
| JM EPDM Peel (lb) | 0.97 | 0.3 | 1.27 | 1.5 | 6.3 | 5.88 |
| Failure Type | AF | AF | AF/Slight wood fail | AF | CF/AF/Wood fail | 70% AF/30% CF/Some wood fail |

The results of Table 10 demonstrate that combinations of styrenated phenols and tackifier resins perform well in the formulation of the present invention when used on TPO membranes as well as EDPM membranes.

Example 6—Use of Styrenated Phenol Analogs at Low CPO Concentrations

Working examples of adhesive formulations according to the present invention were prepared with styrenated phenol analogs to demonstrate their effectiveness in the formulations of the invention. The listed materials are functional analogs to styrenated phenol in that they are hydroxyl-functional liquids of high solubility and low volatility. In that sense they are more functional analogs than structural analogs. Formulations were prepared according to TABLE 11.

TABLE 11

Formulations of Example 6.

| Component | Ex. 6.1 (wt %) | Ex. 6.2 (wt %) | Ex. 6.3 (wt %) |
|---|---|---|---|
| Styrenated phenol #1 | 3.27 | 3.27 | 21.58 |
| Propylene glycol phenyl ether | 18.32 | 0.0 | 0.0 |
| Tripropylene glycol monobutyl ether | 0.0 | 18.32 | 0.0 |
| 0.7 micron PCC | 52.13 | 52.13 | 52.13 |
| Xylene | 4.17 | 4.17 | 4.17 |
| VTMO | 1.52 | 1.52 | 1.52 |
| Silylated Polymer | 16.37 | 16.37 | 16.37 |
| DAMO | 1.97 | 1.97 | 1.97 |
| Plastic Microballoon | 0.28 | 0.28 | 0.28 |
| CPO | 1.69 | 1.69 | 1.69 |
| DBTDL | 0.28 | 0.28 | 0.28 |
| Total | 100 | 100 | 100 |

The formulations of Example 6 were tested on TPO and Fibertite membranes using a similar procedure as described in Example 1. The results are shown in Table 12.

TABLE 12

Strength Testing Results of Example 6.

| Parameter | Ex. 6.1 | Ex. 6.2 | Ex. 6.3 |
|---|---|---|---|
| Elongation (%) | >671 | 299 | >678 |
| Ultimate St (psi) | >58 | 114 | >99 |
| 100% Modulus (psi) | 18 | 64 | 34 |
| Shore A | 15 | 35 | 26 |
| JM TPO Peel (lb) | 4.23 | 8.00 | 13.40 |
| Failure Type | CF | 80% CF/20% AF/Some wood fail | CF |
| Fibertite (blue green)/Plywood Peel (lb) | — | — | 14.00 |
| Failure Type | — | — | CF |
| Fibertile (Ivory)/Plywood Peel (lb) | — | — | 9.00 |
| Failure Type | — | — | CF |

The results of Example 6 demonstrate that other materials than styrenated phenols provide acceptable TPO adhesion in the formulations of the invention.

Example 7—Additional Styrenated Phenol Analogs in Low CPO Formulations

Working examples of adhesive formulations according to the present invention were prepared with styrenated phenol analogs to demonstrate their effectiveness in the formulations of the invention. Formulations were prepared according to TABLE 13.

TABLE 13

Formulations of Example 7.

| Component | Ex. 7.1 (wt %) | Ex. 7.2 (wt %) | Ex. 7.3 (wt %) | Ex. 7.4 (wt %) |
|---|---|---|---|---|
| Nonylphenol | 18.32 | 0.0 | 0.0 | 0.0 |
| Phenyl ethanol | 0.0 | 18.32 | 0.0 | 0.0 |
| Ethyl Hexane diol | 0.0 | 0.0 | 18.30 | 13.69 |
| 0.7 micron PCC | 52.13 | 52.13 | 52.10 | 55.04 |
| VTMO | 1.52 | 1.52 | 1.52 | 1.61 |
| Silylated Polymer | 16.37 | 16.37 | 16.90 | 17.85 |
| Xylene | 4.17 | 4.17 | 4.00 | 4.22 |
| Styrenated phenol #1 | 3.27 | 3.27 | 2.96 | 3.12 |
| DAMO | 1.97 | 1.97 | 1.97 | 2.08 |
| Plastic Microballoon | 0.28 | 0.28 | 0.28 | 0.30 |
| CPO | 1.69 | 1.69 | 1.69 | 1.79 |
| DBTDL | 0.28 | 0.28 | 0.28 | 0.30 |
| Results | 100.00 | 100.00 | 100.00 | 100.00 |

The formulations of Example 7 were tested on TPO membranes using a similar procedure as described in Example 1. The results are shown in Table 14.

TABLE 14

Strength Testing Results of Example 7.

| Component | Ex. 7.1 | Ex. 7.2 | Ex. 7.3 | Ex. 7.4 |
|---|---|---|---|---|
| Elongation (%) | >665 | 193 | >674 | 275 |
| Ultimate St (psi) | >47 | 187 | >78 | 102 |
| 100% Modulus (psi) | 17 | 163 | 31 | 72 |
| Shore A | 17 | 34 | 20 | 32 |
| JM TPO Peel (lb) | 7.08 | 9.10 | 10.5 | 12.5 |
| Failure Type | CF/wood fail | 90% CF/10% AF/Slight wood fail | 95% CF/ 5% AF | 40% AF/40% CF/20% Thin film |

The results of Example 7 demonstrate that materials analogous to styrenated phenols perform similar to styrenated phenols in the adhesive formulations.

Example 8—Varying Ratios of CPO, Chlorinated Paraffin and Styrenated Phenol

Working examples of adhesive formulations according to the present invention were prepared with varying rations of chlorinated olefin, chlorinate paraffin and styrenated phenol to demonstrate their effectiveness in the formulations of the invention. Formulations were prepared according to TABLE 15.

TABLE 15

Formulations of Example 8.

| Component | Ex. 8.1 (wt %) | Ex. 8.2 (wt %) | Ex. 8.3 (wt %) | Ex. 8.4 (wt %) | Ex. 8.5 (wt %) | Ex. 8.6 (wt %) | Ex. 8.7 (wt %) |
|---|---|---|---|---|---|---|---|
| Fumed Silica | 0.0 | 0.0 | 0.0 | 0.0 | 0.0 | 4.57 | 0.0 |
| Styrenated phenol #1 | 17.86 | 13.20 | 21.06 | 24.12 | 24.12 | 43.40 | 24.06 |
| Liquid Chlorinated Paraffin | 2.86 | 13.56 | 0.0 | 2.64 | 2.64 | 4.75 | 2.63 |
| 0.7 micron PCC | 50.84 | 46.97 | 50.85 | 0.0 | 0.0 | 0.0 | 46.85 |
| Ground CaCO3 | 0.0 | 0.0 | 0.0 | 46.97 | 0.0 | 0.0 | 0.0 |
| 0.1 micron PCC | 0.0 | 0.0 | 0.0 | 0.0 | 46.97 | 0.0 | 0.0 |
| VTMO | 1.48 | 1.37 | 1.51 | 1.37 | 1.37 | 2.47 | 1.37 |
| Silylated Polymer | 16.24 | 15.00 | 15.86 | 15.00 | 15.00 | 27.00 | 14.97 |
| DAMO | 1.92 | 1.78 | 1.92 | 1.78 | 1.78 | 3.20 | 1.77 |
| Plastic Microballoon | 0.27 | 0.25 | 0.27 | 0.25 | 0.25 | 0.46 | 0.25 |
| Xylene | 4.95 | 4.57 | 4.95 | 4.57 | 4.57 | 8.22 | 4.71 |
| CPO | 3.30 | 3.05 | 3.30 | 3.05 | 3.05 | 5.48 | 0.0 |
| Maleated CPO | 0.0 | 0.0 | 0.0 | 0.0 | 0.0 | 0.0 | 3.14 |
| DBTDL | 0.27 | 0.25 | 0.27 | 0.25 | 0.25 | 0.46 | 0.25 |
| Results | 100.00 | 100.00 | 100.00 | 100.00 | 100.00 | 100.00 | 100.00 |

FIG. 8 discloses embodiments of the invention wherein the ratio of liquid chlorinated paraffin to styrenated phenol is evaluated.

The results of Example 8 demonstrate that low levels of styrenated phenol still provide good adhesion results and is better than blended with liquid chlorinated paraffin.

TABLE 16

Strength Testing Results of Example 8.

| Component | Ex. 8.1 (wt %) | Ex. 8.2 (wt %) | Ex. 8.3 (wt %) | Ex. 8.4 (wt %) | Ex. 8.5 (wt %) | Ex. 8.6 (wt %) | Ex. 8.7 (wt %) |
|---|---|---|---|---|---|---|---|
| Elongation (%) | 119 | >680 | >680 | >680 | 570 | 680 | >671 |
| Ultimate St (psi) | 261 | >159 | >100 | >112 | 204 | 145 | >114 |
| 100% Modulus (psi) | 250 | 48.0 | 39.0 | 21.0 | 68.0 | 17.0 | 38.0 |
| Shore A | 35 | 30.0 | 33.0 | 20.0 | 30.0 | 14.0 | 29.0 |
| JM TPO Peel (lb) | 13.0 | 6.0 | 13.5 | 8.54 | 11.3 | 5.28 | 18.0 |
| Failure Type | (CF/wood fail) | (AF/CF/Wood fail) | (80% CF/20% AF/some wood fail) | (CF/wood fail) | (80% CF/20% AF/wood fail) | (70% AF/30% CF) | (CF) |
| JM EPDM Peel (lb) | 8.21 | 7.31 | 7.31 | 7.57 | 6.70 | less than 5.00 | 9.40 |
| Failure Type | (CF/wood fail) | (80% AF/20% CF/some wood fail) | (CF/AF/Some wood fail) | (AF/CF) | (CF/Some wood fail) | (AF) | (CF) |
| JM PVC KEE Peel (lb) | less than 5.00 | 10.0 | 8.64 | less than 5.00 | 10.0 | 9.97 | 12.5 |
| Failure Type | (CF/wood fail) | (80% CF/20% Thin film/wood fail) | (CF/Thin film/wood fail) | (CF/wood fail) | (CF/wood fail) | (CF/wood fail) | (CF/Wood Failure) |
| JM PVC SD Plus Peel (lb) | 10.00 | 10.20 | 9.29 | less than 5.00 | 4.90 | 7.50 | 16.0 |
| Failure Type | (CF/wood fail) | (CF/Thin film/wood fail) | (CF/Thin film/slight wood fail) | (CF/wood fail) | (CF/wood fail) | (CF/Thin film/slight wood fail) | (90% CF/10% Thin Film) |

TABLE 17

Trade Names and Abbreviations.

| Trade Name or Abbreviation | Description or Generic Name |
|---|---|
| VTMO | vinyltrimethoxysilane |
| DAMO | diamino functional silane (n-2-aminoethyl-3-aminopropyltrimethoxysilane) |
| DBTDL | dibutyltin dilaurate |
| TMA 20 | liquid modifier 1.8% OH |
| SMA EF 80 | styrene maleic anhydride #1 |
| Xiran SP10010 | styrene maleic anhydride #2 |
| HRL | rosin ester |
| T 140M | maleic anhydride modified C9 resin |
| PH 23-138 | modified vegetable oil w/some OH |
| PS 4002 | phthalic anhydride diethylene glycol polyol |
| CPO | chlorinated polyolefin |
| Chlorinated polyolefin (CPO)/Resin: | |
| Hardlen 14 LWP | Hard CPO |
| Hardlen CY 2121 P | Maleated CPO |
| Hardlen CY 2121 P/A Link 15 | Silane functional CPO |
| Hardlen DX 530P | CPO |
| Kristallex 3100 | aromatic pure monomer tackifier resin |
| Novares/Rütgers CA 80 | phenolic coumarone-indene resin 3.5% OH |
| SMA EP 400 | phenolic styrene maleic anhydride resin #1 |
| SMA EP 450 | phenolic styrene maleic anhydride resin #2 |
| Teckros R86 | rosin ester tackifier resin |
| Teckros RL 10 | C5 aliphatic resin |
| Teckros RP 103 | rosin phenolic resin |
| Wingtack Extra | C5/C9 tackifier resin |
| Ether/Plasticizer/Phenol/UV Absorber/Modifier: | |
| DIDP | diisodecyl phthalate (plasticizer) |
| Downol PPH | propylene glycol phenyl ether |
| Downol TPNB | tripropylene glycol monobutyl ether |
| Eversorb HP1 | HA1S/UV absorber |
| Kumanox 3110 F | styrenated phenol #4 |
| Kumanox 3111 F | styrenated phenol #5 |
| Nevastain 21 | styrenated phenol #3 |
| Qualice P45 | liquid chlorinated paraffin |
| Reutasolv DI | diisopropyl naphthalene |
| Novares/Rütgers CA 80HA 1100 | hydrocarbon modifier 1.7% OH |
| Novares/Rütgers CA 80L100 | C9 liquid modifier 0% OH |
| Novares/Rütgers CA 80LA 300 | modifier, 2.0% OH |
| Novares/Rütgers CA 80LA 1200 | hydrophobic modifier 2.6% OH |
| Novares/Rütgers CA 80LC 40 | methyl-styrenated phenol mix, 4.0% OH |
| Novares/Rütgers CA 80LC 65 | styrenated phenol w/methyl styrenated phenol |
| Novares/Rütgers CA 80LS 500 | styrenated phenol #1 |
| Novares/Rütgers CA 80LX 200 | liquid modifier 3.8% OH |
| Sartomer SR313A | lauryl methacrylate |
| Sartomer SR335 | lauryl acrylate |
| Sigma Aldrich 59020 | mixed C16-C20 alcohol |
| Western SP 120 | styrenated phenol #2 |
| Fillers: | |
| GCC | ground calcium carbonate |
| PCC | precipitated calcium carbonate |
| Aerosil R202 | fumed silica |
| Carbon black 790P | carbon black |
| Expancell | plastic microballoon |
| Hi Pflex 100 | 3 micron GCC |
| Imsil A25 | amorphous ground silica |
| KRT 12C | titanium dioxide |
| MW 200 | uncoated 17 micron GCC |
| Omyabond 302 | groundcalcium carbonate |
| Pfinyl 402 | 5 micron GCC |
| Super Pflex | 0.7 micron PCC |
| Vicron 15-15 | uncoated 3 micron GCC |
| XTCC 201 | 0.1 micron PCC |

TABLE 17-continued

Trade Names and Abbreviations.

| Trade Name or Abbreviation | Description or Generic Name |
|---|---|
| Polymers | |
| Acclaim 4200/MDI 50 F/F01-H (NB16-62-1, 108-1, 179) | silylated polymer |
| Preminol S 3011/SP 120/IPDI/ F01-H (NB16-114-1) | styrenated phenol reacted into silated polymer |
| Preminol S 4318 F/MDI 50 F/ F01-H (NB16-184) | internally plasticized silylated polymer |
| Velvetol H 2700/MDI 50 F/ F01-H (NB16-73-2) | polytetramethylene ether glycol (PTMEG) polymer |
| Kaneka MS 303H | Kaneka Reference Polymer |
| Kaneka SAX 530 | Kaneka High Strength #1 |
| Kaneka SAX 520 | Kaneka High Strength #2 |
| Kaneka SAX 350 | Kaneka High Strength #3 |
| Kaneka SAX 400 | Kaneka High Strength #4 |
| Kaneka MAX 610 | Kaneka High Strength #5 |
| Kaneka HS2 | Kaneka High Strength #6 |
| NPT R 4052D | NPT High Strength #1 |
| NPT W 4052D | NPT High Strength #2 |
| Risun 30000T | Risun Terminated Polymer |

All examples and conditional language recited herein are intended for pedagogical purposes to aid the reader in understanding the principles of the present invention and the concepts contributed by the inventor in furthering the art. As such, they are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It is to be understood that the embodiments described herein are merely exemplary and that a person skilled in the art may make many variations and modifications without departing from the spirit and scope of the invention. All such variations and modifications are intended to be included within the scope of the invention, as defined by the following claims.

What is claimed:

1. An adhesive composition comprising:
   at least one liquid modifier with hydroxyl functionality, selected from the group consisting of methyl styrenated phenol, nonyl phenol, tristyryl phenol, phenyl ethanol, cardanol, cardanol polyol, and ethyl hexanediol at a concentration ranging from 1 to 40 percent by weight of the adhesive composition;
   at least one polyolefin polymer selected from the group consisting of a chlorinated polyolefin and a chlorinated polymer modified with acryl, maleic acid and/or maleic anhydride; at a concentration ranging from 1 to 22 percent by weight of the adhesive composition and
   at least one silylated polymer selected from the group consisting of silylated urethanes, silylated cashew nut polyols, silylated castor bean polyols at a concentration ranging from 10 to 60 percent by weight of the adhesive composition.

2. The adhesive composition of claim 1, wherein the at least one liquid modifier with hydroxyl functionality is a styrenated phenol monomer comprising greater than 50 percent by weight of the at least one liquid modifier with hydroxyl functionality.

3. The adhesive composition of claim 1, wherein the at least one polyolefin polymer comprises a chlorinated polyolefin.

4. The adhesive composition of claim 1, wherein the at least one polyolefin polymer comprises a maleated polyolefin polymer.

5. The adhesive composition of claim 1, wherein the at least one silylated polymer comprises a silyated urethane polymer.

6. The adhesive composition of claim 1, further comprising a desiccant silane.

7. The adhesive composition of claim 1, further comprising a filler selected from the group consisting of precipitated calcium carbonate, ground calcium carbonate, silica, plastic microballoons, clay, fumed silica, and talc.

8. The adhesive composition of claim 1, further comprising a curing catalyst.

9. The adhesive composition of claim 1, wherein the at least one liquid modifier with hydroxyl functionality comprises 12 to 25 percent by weight of the adhesive composition.

10. The adhesive composition of claim 1, wherein the at least one polyolefin polymer comprises 3 to 15 percent by weight of the adhesive composition.

11. The adhesive composition of claim 1, wherein the at least one liquid silylated polymer comprises 13 to 18 percent by weight of the adhesive composition.

12. The adhesive composition of claim 6, wherein the desiccant silane comprises 1 to 3 percent by weight of the adhesive composition.

13. The adhesive composition of claim 7, wherein the filler comprises 0 to 60 percent by weight of the adhesive composition.

14. The adhesive composition of claim 8, wherein the catalyst comprises 0.03 to 5 percent by weight of the adhesive composition.

15. A method for installing membrane roofing, comprising:
 a. applying the adhesive composition of claim 1 to an unprimed surface selected from the group consisting of an upper surface of a roof deck or a lower surface of a roof membrane while leaving the other surface untreated;
 b. installing the roof membrane onto the roof deck while the adhesive composition is still wet, so that the lower surface of the roof membrane contacts the upper surface of the roof deck.

16. The method of claim 15, wherein the roof membrane is selected from the group consisting of ethylene propylene diene monomer (EDPM) membranes, thermoplastic olefin (TPO) membranes, and polyvinyl chloride (PVC) membranes.

17. The method of claim 15, wherein the roof membrane is a thermoplastic olefin (TPO) membrane.

18. The method of claim 16, further comprising:
 c. allowing the adhesive composition to dry for a period of time sufficient to achieve an adhesive peel strength greater than 5 pounds per inch as determined by suitable standardized test method.

19. A method for installing a building material onto a structural member of a building, comprising:
 a. applying the adhesive composition of claim 1 to an unprimed surface selected from the group consisting of an exterior surface of a structural member or an interior surface of the building material, while leaving the other surface untreated;
 b. installing the building material onto the structural member while the adhesive composition is still wet so that the interior surface of the building material contacts the exterior surface of the structural member.

20. The method of claim 19, wherein the building material is selected from the group consisting of: a polyolefin house wrap, polyvinyl chloride trim boards, composite trim boards, composite decking materials, and flashing membranes.

* * * * *